United States Patent [19]
Fichtner et al.

[11] Patent Number: 5,647,405
[45] Date of Patent: Jul. 15, 1997

[54] DEVICE FOR WINDING COILS FOR ELECTRICAL MACHINES

[75] Inventors: Karl Heinz Fichtner, Hanau; Joachim Nasterlack, Bad Nauheim, both of Germany

[73] Assignee: STATOMAT Spezialmaschinen GmbH, Germany

[21] Appl. No.: 531,317

[22] Filed: Sep. 20, 1995

[30] Foreign Application Priority Data

Sep. 20, 1994 [DE] Germany ................. 44 33 424.9
Mar. 24, 1995 [DE] Germany ................. 195 10 829.9

[51] Int. Cl.⁶ ........................................ B21F 3/04
[52] U.S. Cl. ............................................ 140/92.1
[58] Field of Search ............................... 140/92.1

[56] References Cited

U.S. PATENT DOCUMENTS 3,973,601  8/1976  Arnold et al. ................. 140/92.1

FOREIGN PATENT DOCUMENTS 28 08 048  8/1979  Germany.
37 29 289  3/1989  Germany.

*Primary Examiner*—Lowell A. Larson
*Attorney, Agent, or Firm*—Larson and Taylor

[57] ABSTRACT

The device for winding coils for electrical machines has a spindle box which can be displaced along a guide, a multi-part template held thereon fixed against relative rotation, which can be axially aligned with a coil receiver and can be adjusted to be variable in width. A wire guide rotates around the template and in the process creates coil windings. When the coil width is changed, it is necessary to correctly adjust the spindle box, so that the alignment of a part of the template with the coil receiver is maintained. A measuring system is provided to assure this axial alignment of the parts with great certainty, which measures the distance between a point on the template part and a point on the spindle box as well as the distance between a point on the spindle box and a point on the machine frame.

19 Claims, 7 Drawing Sheets

DEVICE FOR WINDING COILS FOR ELECTRICAL MACHINES

FIELD OF THE INVENTION

The invention relates to a device for winding of coils for electrical machines, with a spindle box which can be displaced by a motor along a guide on a machine frame, with a multi-part template held thereon fixed against relative rotation, one part of which can be axially aligned with a coil receiver, fixable in place at a defined position on the machine frame, and whose width can be adjusted by an essentially uniform change of the distance of its parts from a central shaft, and with a wire guide, seated in the spindle box and movable so as to rotate around the central shaft of the template.

BACKGROUND OF THE INVENTION

If coils of different cross sections, for example for different series of stators with cores of different height, are to be wound sequentially on such a device, the template width must be changed. In the process it is basically intended to adjust the parts of the axially lengthwise divided template uniformly in relation to their central shaft in order to continue to obtain an essentially symmetrical position in respect to the central shaft and therefore the most even wire pull-off possible via the rotating wire guide.

However, the uniform adjustment of the template parts has the result that the template part which guides the coils created on the template to the coil receiver, which consists of parallel fingers which are disposed circularly or on a circle-arc with spaces between them, and for this purpose needs to be brought into axial engagement with the coil receiver, is moved out of the axial alignment required for engagement. For this reason it is necessary, in addition to setting a different template width, to adjust the spindle box in such a way that the alignment of the template in respect to the coil receiver is again correct. If the template and the coil receiver are not properly aligned, these very expensive tools are destroyed when coming together axially.

In actual use it is known to accurately manually adjust the front half of the template, which is to be brought into engagement with the coil receiver, and the spindle box, and to move the rear template half mechanically and to measure it. However, these designs do not solve the actual problem of assuring the exact alignment of the coil receiver and the front template half by simple means independently of human interference and errors, as well as that of malfunction of the machine after the machine has been turned on or the template width has been changed.

Furthermore, various adjusting drives are known for adjusting the spindle box simultaneously with the template. Aside from the fact that complicated and expensive constructions are necessary for this, the uncertainty always remains in connection with the desired automatic process whether a change in the relative position of the parts has not occurred because of unforeseeable changes or actions. Such an error then also remains in case of a controlled new setting of the template width. In addition, it is expensive and dangerous to fall back on stored values of the previously made changes when automatically changing the template width and the position of the spindle box, particularly because errors are compounded in the process.

OBJECT AND SUMMARY OF THE INVENTION

It is the object of the invention to provide a device of the previously mentioned type which is more dependable than heretofore and assures in a simple manner the aligned positioning of the template in respect to the coil receiver, even in case of automatic changes of the template width.

The above object is attained in accordance with the invention by means of a measuring system mounted on the machine frame or the spindle box, by means of which the distance between a point on a template part and a point on the spindle box can be measured, as well as the distance between a point on the spindle box and a point on the machine frame.

The novel device offers the advantage of assuring trouble-free functioning, regardless of the type of adjusting mechanism. It is based on the realization that, because of unforeseeable influential factors, it is not sufficient to couple the adjusting drive of the template with that of the spindle box. The required safety from collisions between the parts of the tool or from producing waste is only obtained if, directly before and/or after an automatically performed change of the template width, the machine itself can determine whether the template has the correct width and is aligned with the coil receiver. For this it would also have been possible per se to determine the position of these two tools in respect to each other directly. However, the suggestion in accordance with the invention envisions a measuring system for indirect control. Instead of the template width, it measures the distance of one of the uniformly adjustable template parts from a point which is fixed in relation to the spindle box, and furthermore determines the distance of the spindle box from a fixed point on the machine frame. It is then possible in a simple manner to calculate from these two measured values, which can be obtained simpler in this way than directly from the tool parts, what the width of the template is and whether its one part is aligned with the coil receiver in the manner provided.

In a first preferred embodiment of the invention, the two elements of the measuring system associated with the two distances to be measured are spatially and functionally connected with each other in that the measuring system consists of two sensor heads, each of which can be extended away from a support element by means of two power cylinders from a defined initial position in opposite directions. One of these can be moved in the direction toward a template part and the other in a direction toward a point on the machine frame. In a useful manner, an extractable cable is stretched between the two sensor heads in the process, whose extracted length can be determined by a measurement sensor. In this case a single measurement sensor is sufficient for the two different distance measurements.

The device becomes particularly cost-effective in that in the preferred actual embodiment the measuring system is seated on a wire drawing device mounted on the spindle box, which is normally present anyway in such a winding device. In this case the motion drive of the gripper of the wire drawing device can be used to move the one sensor head in the direction toward the template.

The novel measuring system for indirect measuring of the template width and the correct alignment of the template in respect to the coil receiver permits the employment of controlled but very simple motion drives for changing the template width, and for displacement of the spindle box along its guide on the machine frame. The last mentioned drive can take place by means of a rotatably drivable screw spindle, for example, which is seated on the machine frame and cooperates with a nut which is fixed, secure against relative rotation, on the spindle box. No separate drive at all is required for changing the template width if, in a preferred embodiment of the invention, the rotary drive of the wire guide is used for this. This can suitably take place in a manner where two template parts are seated, fixed against relative rotation, on threaded sections with oppositely directed pitch of an adjusting spindle which can be driven by a worm drive, whose worm is rotatably seated on the central shaft of the template, rotatable together with the wire guide, and which can be connected with the shaft, fixed against relative rotation, by means of a controllable coupling. In this connection it is also possible to do without the drive for the coupling movement, if a coupling between the rotatable central shaft of the template and the worm is selected, which can be engaged by an axial movement, which can be axially loaded directly or indirectly by a shaft equipped with coil strippers and which can be axially advanced when the template is retracted from the coil receiver. A very simple coupling is obtained by the use of a star disk which is connected, fixed against relative rotation, with the worm or the rotatable central shaft of the template and which comes into frictional contact against the respectively other part by axial loading.

It should be understood that the mentioned drive for changing the template width can also be used advantageously even if a winding device does not have a measuring system for the automatic control of the template width and the template position.

In connection with a further embodiment preferred in actual use, the distance between a point on the machine frame and a point on the spindle box can be measured by means of a measuring system which measures the displacement path of the spindle box from a defined initial position to a place to be measured. Preferably the distance between a point on the spindle box and a point on a template part is correspondingly also measurable by means of a measuring system which measures the displacement path of the spindle box between a defined initial position and a second position wherein a template part takes up a defined position in relation to the machine frame. This embodiment becomes particularly simple if the spindle box can be coupled with a wire drawing device and can be displaced by its drive. Since the drive of the wire drawing device is controllable and for this purpose has a measuring sensor measuring the displacement path, an additional displacement drive for the spindle box, together with a device for measuring the displacement path, can be omitted in this embodiment. The drive of the spindle box by means of the wire drawing device can already be advantageous if only one or none of the two measuring processes is performed by a spindle box displacement.

Exemplary embodiments of the invention will be described in detail below by means of the drawings.

DETAILED DESCRIPTION OF THE PREFERRED EMBODIMENT

Figure 1:
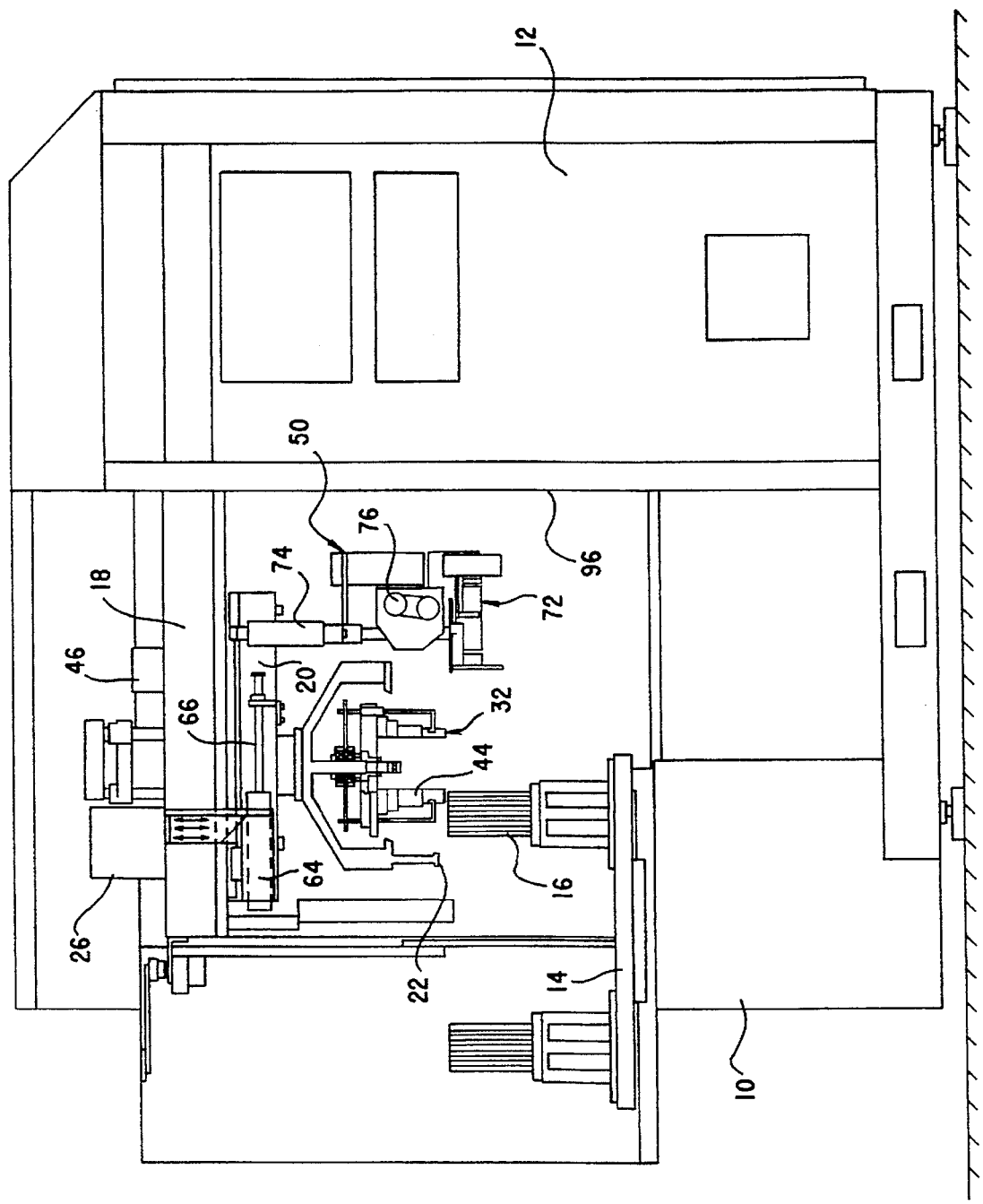
FIG. 1 is a lateral view of a coil winding device with a measuring system for controlling the template width and the template position.
Figure 2:
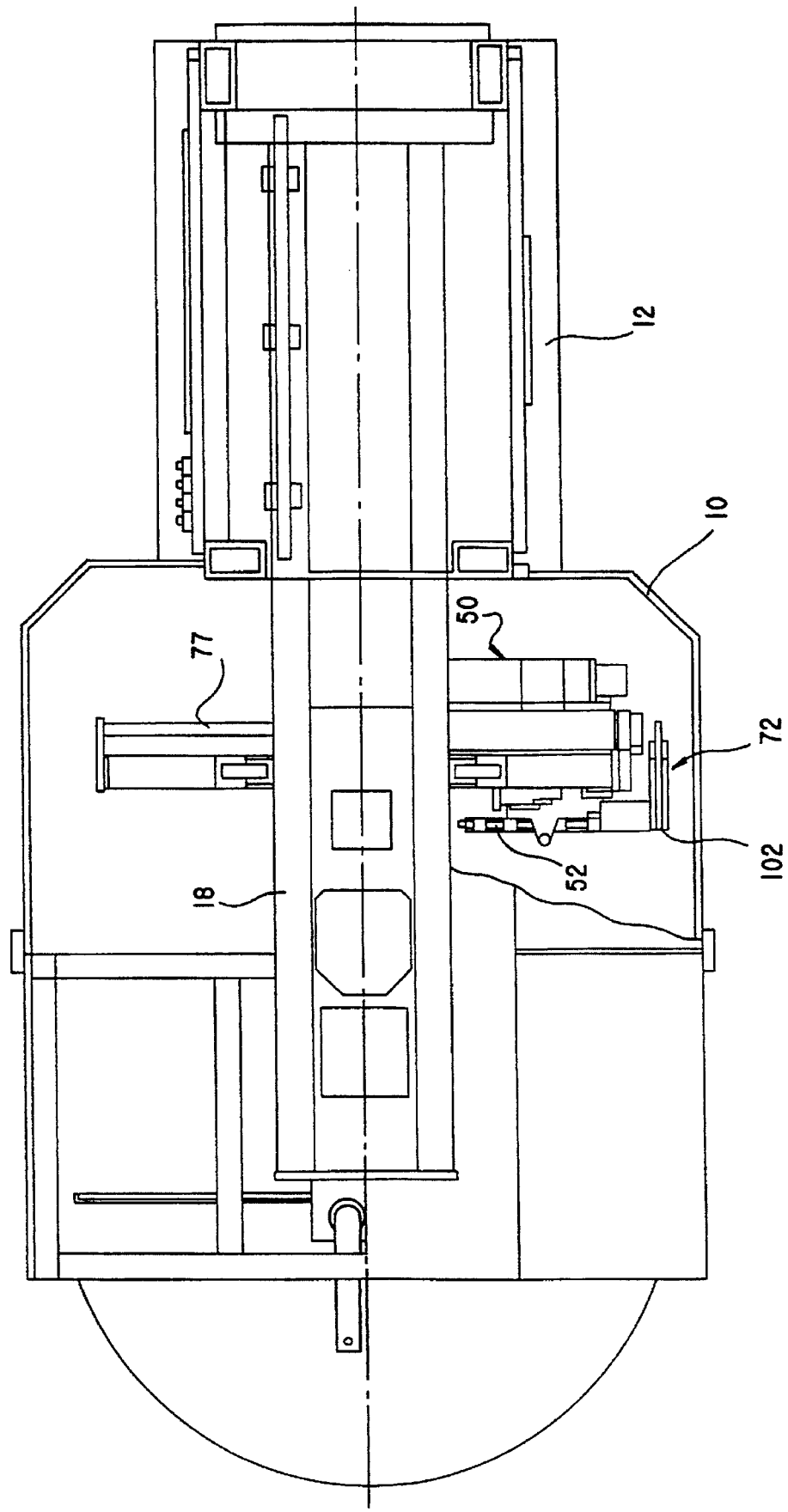
FIG. 2 is a top view of the winding device of FIG. 1.

The winding device shown in a lateral and top view in FIGS. 1 and 2 has in a conventional manner a machine frame 10, a control cabinet 12, and a turntable 14 seated on the bed of the machine frame with, for example, two chucks for coil receiver 16. This can be a transfer clamp or an inserting tool. Both have a collar or a circle-shaped arrangement of vertical parallel fingers, in the spaces between which the wound coils are suspended. Subsequently an inserting tool can be conveyed directly to a wire drawing device where the coils are drawn, for example axially, into the stator of an electric motor. If the coil receiver is a transfer clamp, the coils are first transferred by it to an inserting tool and the drawing of the coils into a stator then takes place by means of it.

In accordance with FIG. 1 the coil receiver 16, indicated on the right there, is at the station of the turntable 14 where the wound coils are transferred to the receiver 16. Normally the coil receiver 16 can be triggered to rotate in this station in order to be able to receive consecutively wound coils or groups of coils distributed over the circumference. After the turntable 14 has been subsequently rotated by 180°, the loaded coil receiver 16 is in the station of the turntable 14 shown on the left in FIG. 1, which is the loading and unloading station. An empty coil receiver 16 is brought into the work station simultaneously with this rotating movement.

A spindle box 20 is seated linearly displaceable in a linear guide 18 disposed at the top of the machine frame 10. It is of conventional design, so that it is not necessary to discuss it in detail. The spindle box 20 contains the drive for a wire guide 22, customarily called a flyer. It has the shape of an outlet nozzle which can be rotatably driven around an axis of rotation 24 by means of a rotary drive motor 26 mounted on the spindle box.

Figure 3:
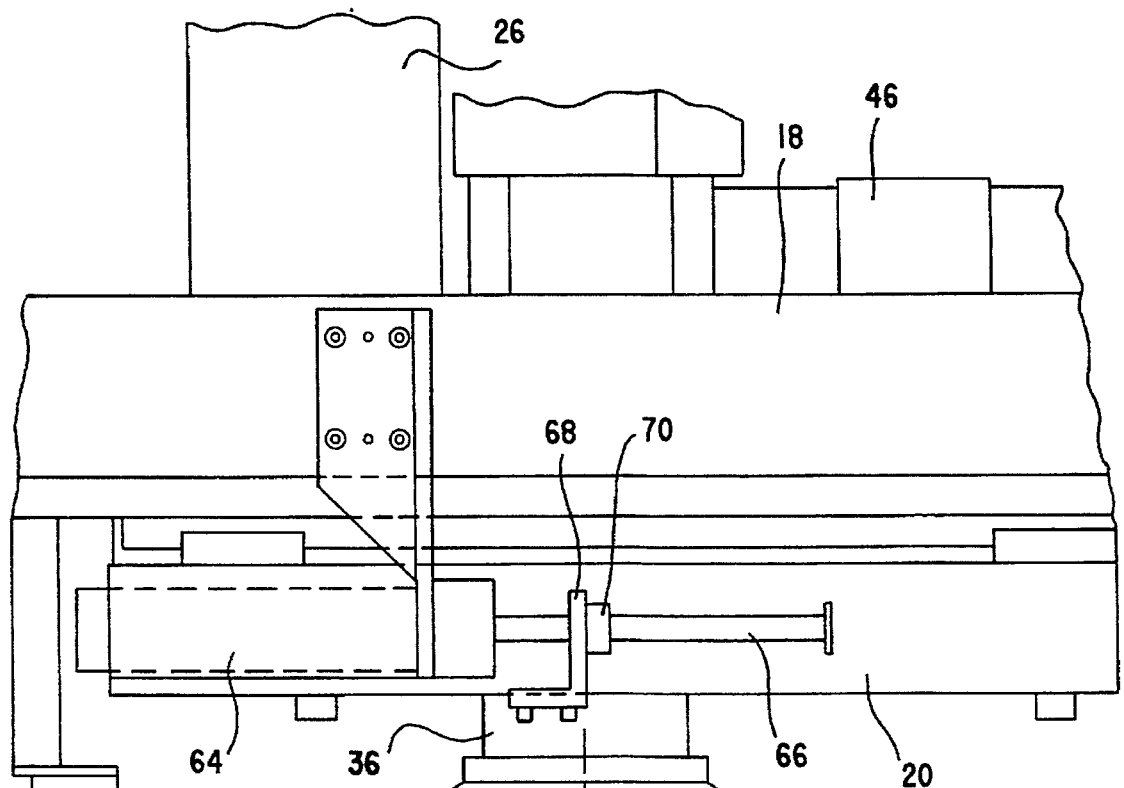
FIG. 3 shows the template and the coupling for switching on its adjusting drive in a larger scale than in FIG. 1.
Figure 4:
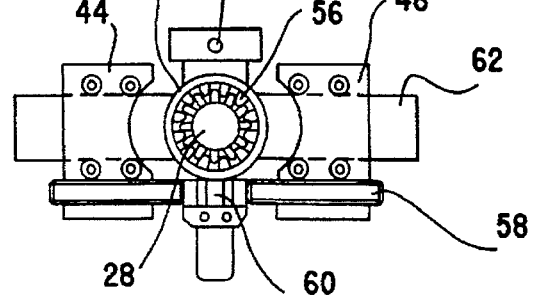
FIG. 4 is a top view of the template of FIG. 3.

The spindle box 20 furthermore contains a central shaft 28, which rotates around the axis of rotation 24 together with the wire guide 22, vertically projects downward and supports a template 32 on its lower end by means of a ball bearing 30 (see FIG. 3). So that the template 32 does not rotate along with it, it is fixed against relative rotation by a rod 34 (see FIG. 4) extending parallel with the central shaft 28. A support drive 36, which is a part of the spindle box 20, provides the non-rotatable seating of the rod 34 and therefore of the template 32.

The central shaft 28 which supports the template 32 extends through a hollow shaft 38 on whose lower end a swash plate 41 is seated on roller bearings 40 and on an oblique seating surface above the template 32 and supports strippers 42 in a radially displaceable manner, which are guided axially displaceable on the template 32. The central shaft 28 as well as the hollow shaft 38 are seated axially displaceable in the spindle box 20.

In the initial situation prior to winding a coil group, the template 32 takes up the upper position shown in FIG. 3, wherein the lower template step is on the level of the wire guide 22. In correspondence with the oblique position of the swash plate 41, the lower ends of the strippers 42 are partially located slightly above and slightly below the winding plane extending horizontally on the level of the wire guide 22. Prior to start-up of the winding process, the template 32 in accordance with FIG. 1 has already been lowered far enough so that the thicker front part 44 of the template 32, which is provided with recesses at the lower end, is in engagement with defined fingers of the coil receiver 16. While the wire end protruding from the wire guide 22 is temporarily kept clamped by means of a clamping and cutting device, not shown, or a wire drawing device 50 while a few turns are wound, the wire guide 22 begins to rotate around the template, in the course of which coil windings are created on the lowest template step. Since the swash plate 41 simultaneously makes the strippers 42 perform an axial back-and-forth movement, so that they push every last created coil winding out of the winding plane towards the lower end of the template 32 by means of their lower ends, most of the coil windings created on the template are already pushed between the fingers of the coil receiver 16 during the winding process.

After the coil with the smallest diameter of a coil group has been created with all windings on the lowest step of the template 32, the central shaft 28, together with the template 32, jumps downward while continuing to be in engagement with the coil receiver 16 so that now the second template step lies on the level of the wire guide 22. The swash plate 41 and the strippers 32 are not advanced, i.e. the hollow shaft 38 retains its axial position. Thus the jump drive represented in FIG. 1 at 46 only acts on the central shaft 28.

After again the preset number of coils with a cross section of the second smallest or second lowest template step have been wound on this template step, wherein essentially all windings have already been stripped off by the strippers 42 into the coil receiver 16 during the winding process, a further downward jump of the template 32 takes place by means of the jump drive 46, and the winding process is then continued with winding the next larger coil, etc. The number of template steps is determined by the number of coils per coil group.

As far as described up to now, the winding device represented in FIGS. 1 and 2 is constructed in the way usual in the prior art. Furthermore, the use of axially lengthwise divided templates with a front part 44 and a rear part 48 is also known, wherein the distance between these two template parts, i.e. the template width, can be adjusted. Finally, the use of a wire drawing device 50 is also known and customary. It is fastened to the spindle box 20 and has a gripper 52 (see FIG. 2) which is controllably movable in the X-, Y- and Z-axes and by means of which the wire, which is clamped or loosely held between the wire guide and the template after winding of a coil group, can be grasped and pulled out in such a way that a wire connection to the next coil group of the appropriate required length is created.

If first the coils for stators of a defined core height are wound and then it is intended to produce coils for stators with the same core cross-section, but a greater stamping height, it is only necessary to increase the template width, i.e. the distance between the template parts 44 and 48. A novel adjusting drive and a novel coupling device are provided for this by the represented and described winding device. The rotary drive of the wire guide 22, which is also effective at the central shaft 28, is used as adjusting drive. To change the template width, a coupling disk 56, radially disposed between the rotatably drivable central shaft 28 and a worm 54 and operating frictionally connected, is actuated and provides a torque- transmitting connection between the central shaft 28 and the worm 54. The worm 54 cooperates with a worm wheel 60 fixedly seated on the center part of an adjusting spindle 58 or made of one piece with it. The worm 54, which is concentric with the central shaft 28, as well as the adjusting spindle 58 extending horizontally and parallel with the linear guide 18, are rotatably seated on the upper part of the template 32, the so-called template support 62, which is supported by the central shaft 58. The template front part 44 and the template rear part 48 are guided on the template support 62, linearly displaceable parallel with the linear guide 18, and they in turn guide the strippers 42. Because the adjusting spindle 58 has threaded sections of the same pitch but opposite pitch direction on both sides of the worm wheel 60, and because each threaded section is in threaded connection with respectively one of the two stepshaped template parts 44 and 48, a rotating movement of the worm 54 in the one or the other direction of rotation results in respectively oppositely directed linear movements of the two template parts 44 and 48. When no drive acts on the worm 54, the template parts 44 and 48 are maintained in the respectively set position by the self-locking of the engagement of the threads with the adjusting spindle 58.

In the exemplary embodiment, the coupling disk 56 is a so-called star disk, which is connected fixed against relative rotation with the worm 54 and which is supplied, for example, by the firm Ringspann. The radially inner area of the star disk 56 is upwardly arched in the released state of the coupling, and in this position the interior diameter of the star disk is greater than the exterior diameter of the central shaft 28. However, when the radial disk 56 is axially loaded from above, it comes to rest in a frictionally connected manner against the circumference of the rotatably drivable central shaft 28 and provides a torque-transmitting contact with the worm 54.

To exert pressure from above on the star disk 56 for coupling, the lower end of the hollow shaft 38, or a bushing inserted therein and projecting downward, is moved against the star disk 56. The axial drive for the hollow shaft required for this is already present, because in the lowest position of the template 32, which it assumes at the end of the production of a coil group and wherein it is farthest moved into the coil receiver 16, the strippers 42 are moved downward by a defined amount into the coil collector 16 for stripping off the last wire turns still seated on the template 32 and remain in this position, while the template is retracted upward. If the coupling 56 is to be actuated, the template 32 is pulled into its uppermost position in which it is not in engagement with the coil receiver 16 and the control command is then issued to the axial adjusting drive of the hollow shaft 38 to move the swash plate 41 with the strippers 42 into the lower position, such as for stripping off the last turns from the template inserted into the coil receiver. This long axial stroke of the hollow shaft 38 is not performed because the template 32, which is in its uppermost position, blocks the movement of the hollow shaft 38. However, the pressure of the lower part of the hollow shaft 38 causes the desired movement of the coupling disk 56.

Although the two threaded sections of the adjusting spindle 58 have opposite pitch directions, they have the same amount of pitch. For this reason the template parts 44 and 48 uniformly move away from or toward the central shaft 28 during a rotating movement of the adjusting spindle 58. This means in turn, that following a change in the template width the template front part 44, which was previously correctly aligned with the disks of the coil receiver 44, is now no longer in predetermined alignment with the coil receiver, and that therefore the template can no longer be brought into the engagement position with the receiver 16 required for transferring the wound coil turns to it. To again reach this position it is necessary to displace the spindle box 20 together with the wire guide 22 and the template 32 along the guide 18 by an appropriate amount which, with the uniform adjusting movement of the two template parts 44 and 48 by means of the adjusting spindle 58, is half as great as the change made in the template width. The displacement of the spindle box 20 along the guide 18 takes place by means of a motor 64 seated on the machine frame and rotatingly driving a screw spindle 66 which is in threaded engagement with a nut 70, fixed against relative rotation to the spindle box 20 by means of a holder 68.

In order to be able to control the motion drives of the spindle box and the adjustment of the template width exactly and troublefree, a measuring system, identified by 72 as a whole, is mounted on the wire drawing device 50. In the exemplary embodiment, the gripper 52 of the wire drawing device 50 is moved by means of three power cylinders or servomotors arranged at right angles to each other. A first cylinder 74, arranged vertically, moves the gripper 52 in the direction of the Z axis. A servomotor indicated at 76 in FIG. 1 moves the gripper 52 by means of an adjusting spindle 77 horizontally transversely to the linear guide 18 in the direction of the X axis. The support element of the gripper 52 and the measuring system 72 moved horizontally by this servomotor 76 is identified by 78 in FIG. 5. A cylinder-piston unit 80 is mounted on this support element 78 for moving a front part 82 fixedly connected with the gripper 52 horizontally in the direction of the Y-axis, i.e. parallel with the linear guide 18 of the spindle box 20. The front part 82 of the wire drawing device 50 not only supports the gripper 52, but also a measuring cylinder 86 which can also be extended with its piston rod 84 in the direction of the Y-axis toward the template 32. Finally, a still further measuring cylinder 88 is mounted on the support element 78, whose piston rod 90 can be extended also in the direction of the Y-axis, but away from the template 32 and which supports a measuring sensor 92, which can be placed with a contact surface 94 against a fixed wall 96 of the machine frame 10.

Figure 5:
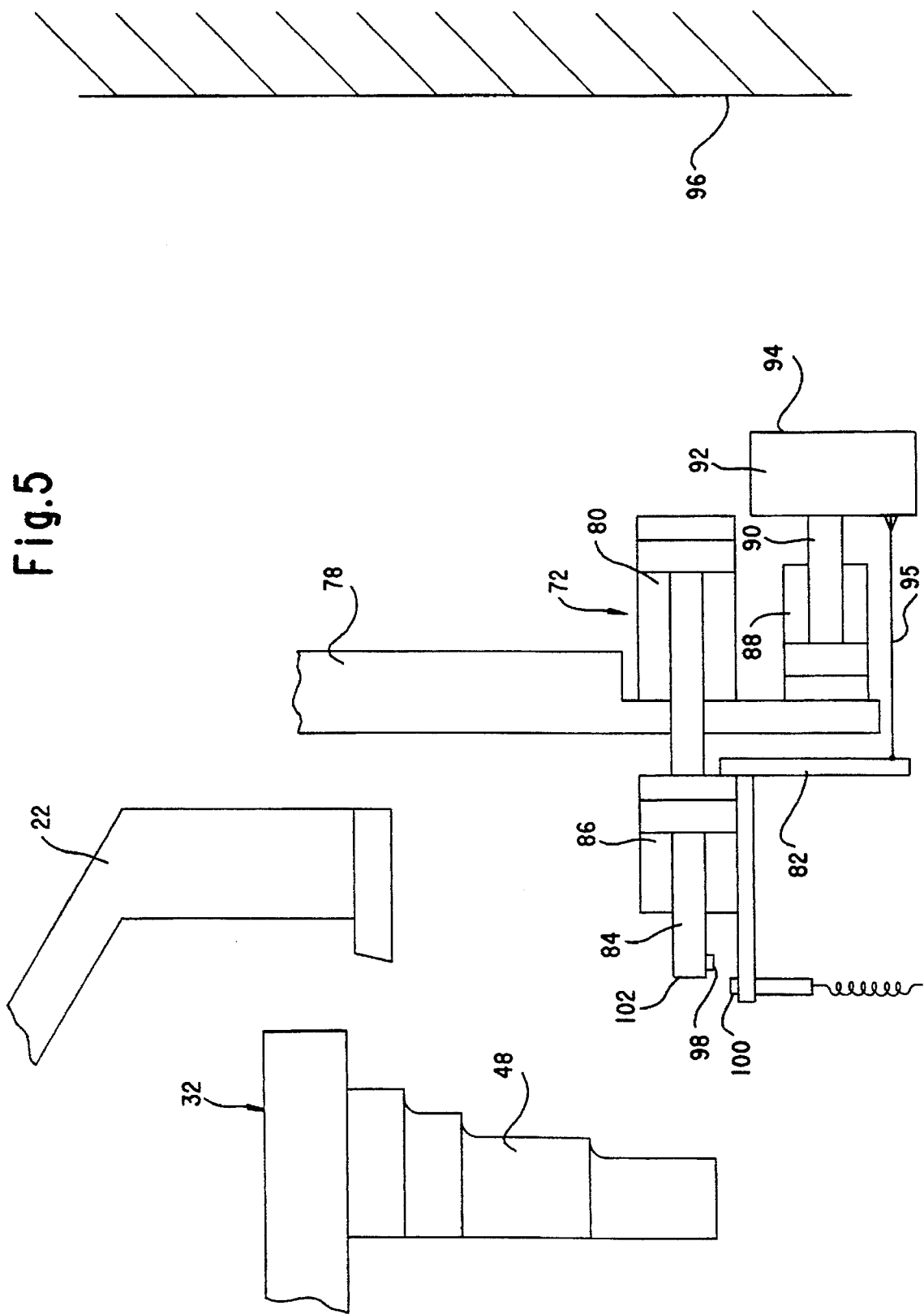
FIG. 5 is a schematic representation in a lateral view of the measuring system for controlling the template width and the template position.

A cable 95 is stretched between the front part 82 of the wire drawing device 50 and the measuring sensor 92 which, when these two parts move away from each other, can be wound off a spring-loaded reel rotatably seated in the measuring sensor 92. The angle of rotation of the reel is scanned for obtaining measuring signals corresponding to the drawn-out cable length 95. As can be seen in FIG. 5, the cable 95 is extracted when the measuring cylinder 88 moves the measuring sensor 92 until its contact surface 94 rests against the wall 86, as well as when the cylinder-piston unit 80, hereinafter identified as Y-cylinder, pushes the front part 82 of the wire drawing device 50 in the opposite direction toward the template 32.

The wire drawing device 50 is attached very accurately and solidly at a exactly defined place on the spindle box 20, so that in connection with the distance measurement to be performed in the direction of the Y-axis the distance of the support element 78 from the fixed wall 96 of the machine frame is a measure of the position of the spindle box 20 with the central shaft 28 in respect to the coil receiver 16. This distance between the elements 78 and 96 is measured by extending the measuring cylinder 88 until the contact surface 94 rests against the wall 96 while the Y- cylinder 80 is in its fully retracted initial position. The length of cable 95 pulled out of the measuring sensor 92 therefore corresponds to the distance between the elements 78 and 96.

The template width, i.e. the spread of the template parts 44 and 48, is measured, with the measuring cylinder 88 pulled back into the initial position, in that first the piston rod 84 of the measuring cylinder 86 is extended in the direction toward the template 32. In the process, a switching lug 98 attached to the front end of the piston rod 84 moves past a proximity initiator (Bero) 100, whose operability is checked in the process. However, in the course of this extension of the piston rod 84 into its extreme position, no cable 95 is drawn out of the measuring sensor 92. The front face 102 of the piston rod 84, which is used as sensor head, also does not yet come into contact with the template 32.

After the measuring cylinder 86 has been fully extended, the Y-cylinder 80 is activated and pushes the front part 82 of the wire drawing device 50 further forward against the template 32. In the process the front face 102 of the piston rod 84 contacts a defined point of the rear part 48 of the template 32. Because the force of the Y-cylinder 80 is greater than the force of the measuring cylinder 86, the piston rod 84 is pushed back into the measuring cylinder 86 during the further extension of the Y- cylinder 80. Cable 85 is pulled off the measuring sensor 92 during the entire phase of the extension of the Y-cylinder 80. As soon as the switching lug 98 moves past the proximity initiator 100 during the push-back of the piston rod 84, the measuring system registers the extracted cable length 95. It is a measure for the distance of the template part 48 from the support element 78, so that it is possible to also calculate from this the distance of the template part 48 from the central shaft 28. Since the two template parts 44 and 48 move uniformly during the adjustment of the template width, the distance of the front template part 44 from the central shaft 28 is therefore also known.

It is recommended to perform the two measurements described above each time the winding device is put into operation. The control device of the machine only permits start-up when the two distance measurements have shown that the front template part 44 is properly aligned with the coil receiver 16 and that the template width is also correct. If it is intended at a later time, after a defined amount of wound coil groups, to change the template width in the course of transition to larger coils for stators of a greater height, it is possible to immediately perform the adjustment of the template parts 44 and 48 as well as the corrected displacement of the spindle box 20 on the basis of the stored distance values, and subsequently the two distance measurements can again be performed for safety reasons in order to control the correct positioning of the template parts and the spindle box before the machine begins the next winding process. However, it is also possible to proceed by performing the distance measurements in principle directly prior to every change of the template width and to control the displacement drives for the template and the spindle box on the basis of the values determined in the process. Since this control is quite accurate, normally no further measurements are needed. However, if occasionally a slippage occurs at the frictionally connected coupling 56, it can also be provided that the two described measuring processes are performed before as well as after a change of the template width and of the correcting movement of the spindle box 20 for reinstating the alignment between the template and the coil receiver 16. It is understood that suitably in all measurements the power cylinder 74 and the servomotor 76 should be in defined initial positions and that the axial position of the template 32 should be the same, so that the contact surfaces 94 or 102, used as sensor heads, come to rest on the same respective places of the wall 96 or the rear template part 48.

It is furthermore understood that in view of the described measuring system 72 other displacement drives for the change of the template width and for displacing the spindle box 20 can be used, and that also a different coupling can be used in place of the star disk 56. It is furthermore not absolutely required to mount the measuring system on the wire drawing device 50. It could also be attached in its own holder to the spindle box 20 or the machine frame 10, 96 and operate with movement bodies and measuring sensors different from those shown. For example, it would be possible to employ electrically driven servomotors with screw spindles in place of the measuring cylinders 86 and 88, and separate measuring sensors could be provided for both distance measurements in place of the single measuring sensor 92, 95. Finally, the measuring cylinder 86 could also be omitted and the sensor head 102 could be moved against the rear part 48 of the template 32 by only the Y-cylinder 80.

While the above mentioned variation options relate to the exemplary embodiment represented in FIGS. 1 to 5, a further exemplary embodiment of a coil winding device is shown in FIGS. 6 to 9, wherein the automatic control of the template width and of the position of the spindle box takes place in a way different from that in connection with the first described machine. However, since the two winding machines agree to a large extent in their basic construction, corresponding parts have been provided with the same reference numerals in the drawings. It will be no longer necessary to discuss these in detail in the following description of the device in accordance with FIGS. 6 to 9.

Differing from the embodiment in accordance with FIGS. 1 to 5, the motor 64, which displaces the spindle box 20 via a screw spindle 66 and a nut 70, is lacking in the winding device in accordance with FIGS. 6 to 9. The spindle box 20 does not have its own motion drive in the machine in accordance with FIGS. 6 to 9. As can be best seen from FIG. 7, the spindle box consists of a support plate 116, essentially in the shape of a double-T, which is connected on its four corners with carriages 118, which are guided on the linear guide 18 consisting of two parallel rails. As can best be seen from FIG. 8, the support plate 116 is suspended from the two rails constituting the linear guide 18 by means of the carriages 116, wherein a ball bearing is preferably employed. The various units which are part of the spindle box 20 are seated on the support plate 116, among others the support drive 36, the template 32 with the jump drive 46 and the flyer 22, which in the case of the example has the shape of a protecting bell for avoiding an imbalance, as well as its drive motor 26.

Figure 7:
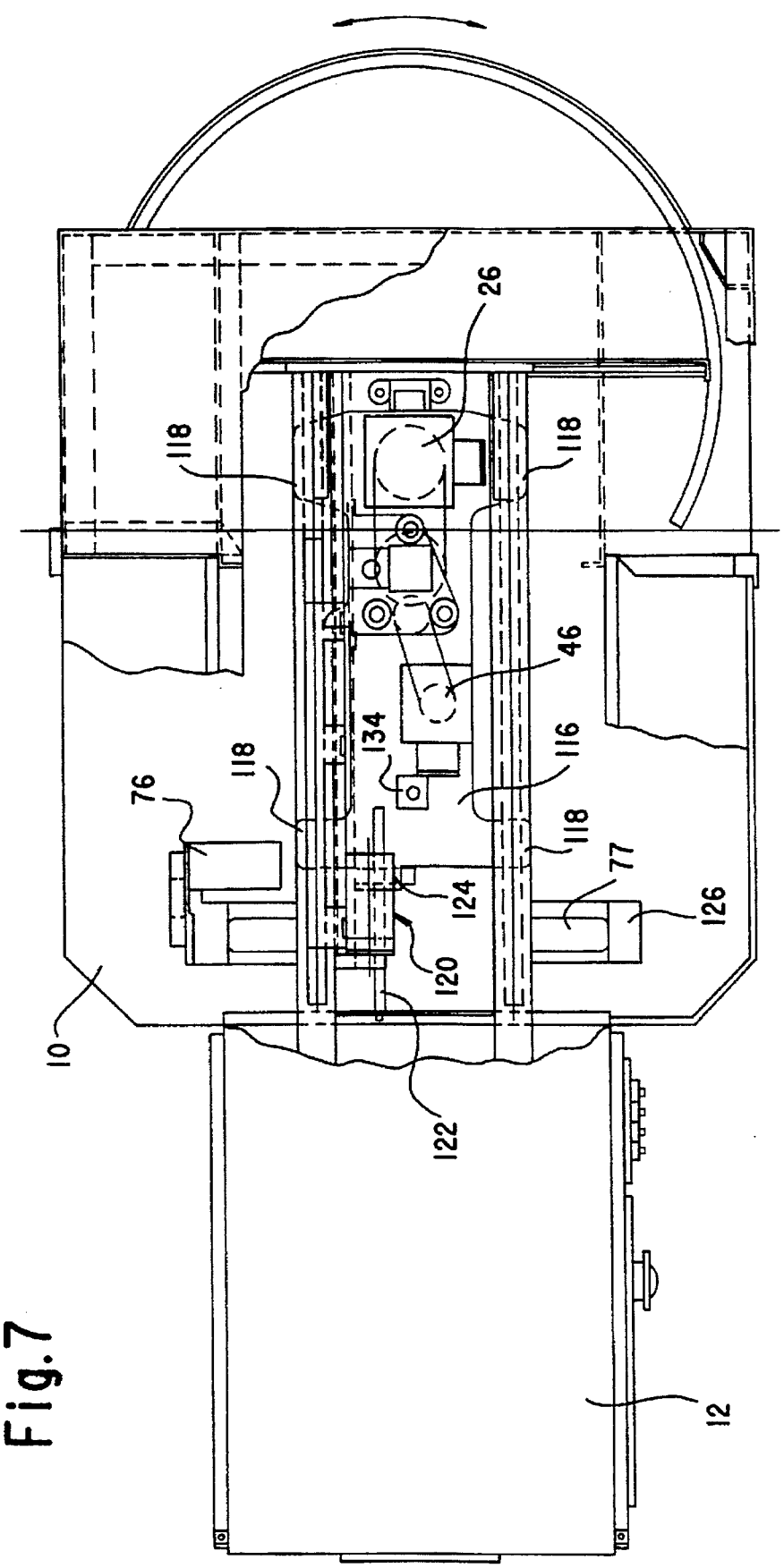
FIG. 7 is a top view of the winding device of FIG. 6.

To this extent the spindle boxes 20 of the two described exemplary embodiments agree. In the second embodiment a brake 120, represented in FIG. 7, is additionally provided for braking the spindle box 20 in any arbitrary position on the linear guide 18. In the exemplary embodiment the brake 120 consists of a rod 122, fastened on the machine frame and extending parallel with the linear guide 18, and of a brake cylinder 124, fastened on the support plate 116, by means of which brake claws pressed against the rod 122 by springs can be released against the spring force. The spindle box 20 is therefore normally secured by the brake 120 in respect to the machine frame 10. But after releasing the brake 120 it can be displaced in the direction of the Y-axis.

Figure 6:
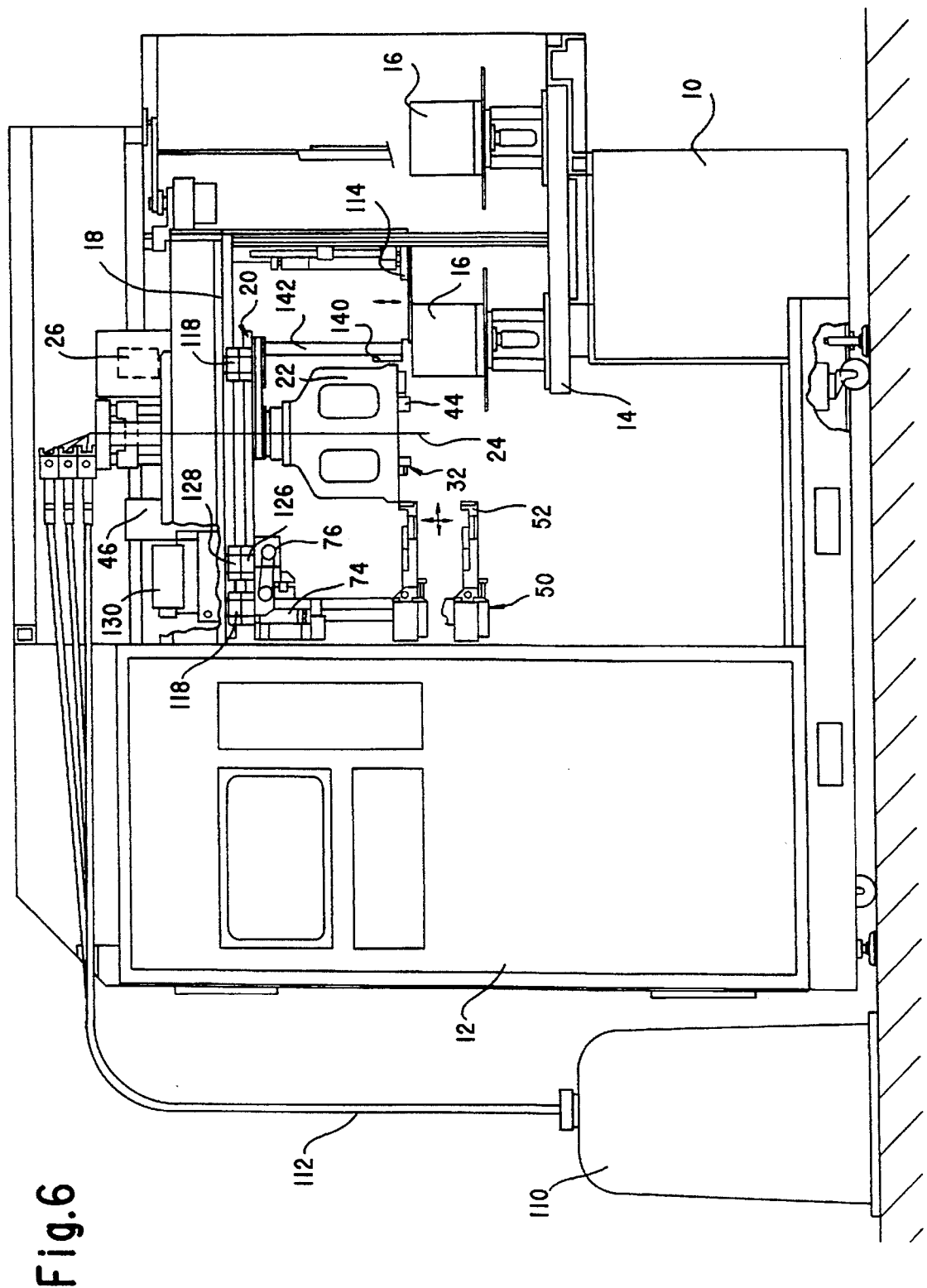
FIG. 6 is a lateral view, corresponding to FIG. 1, of a further exemplary embodiment of a coil winding device with a different measuring system for controlling the template width and the template position.
Figure 8:
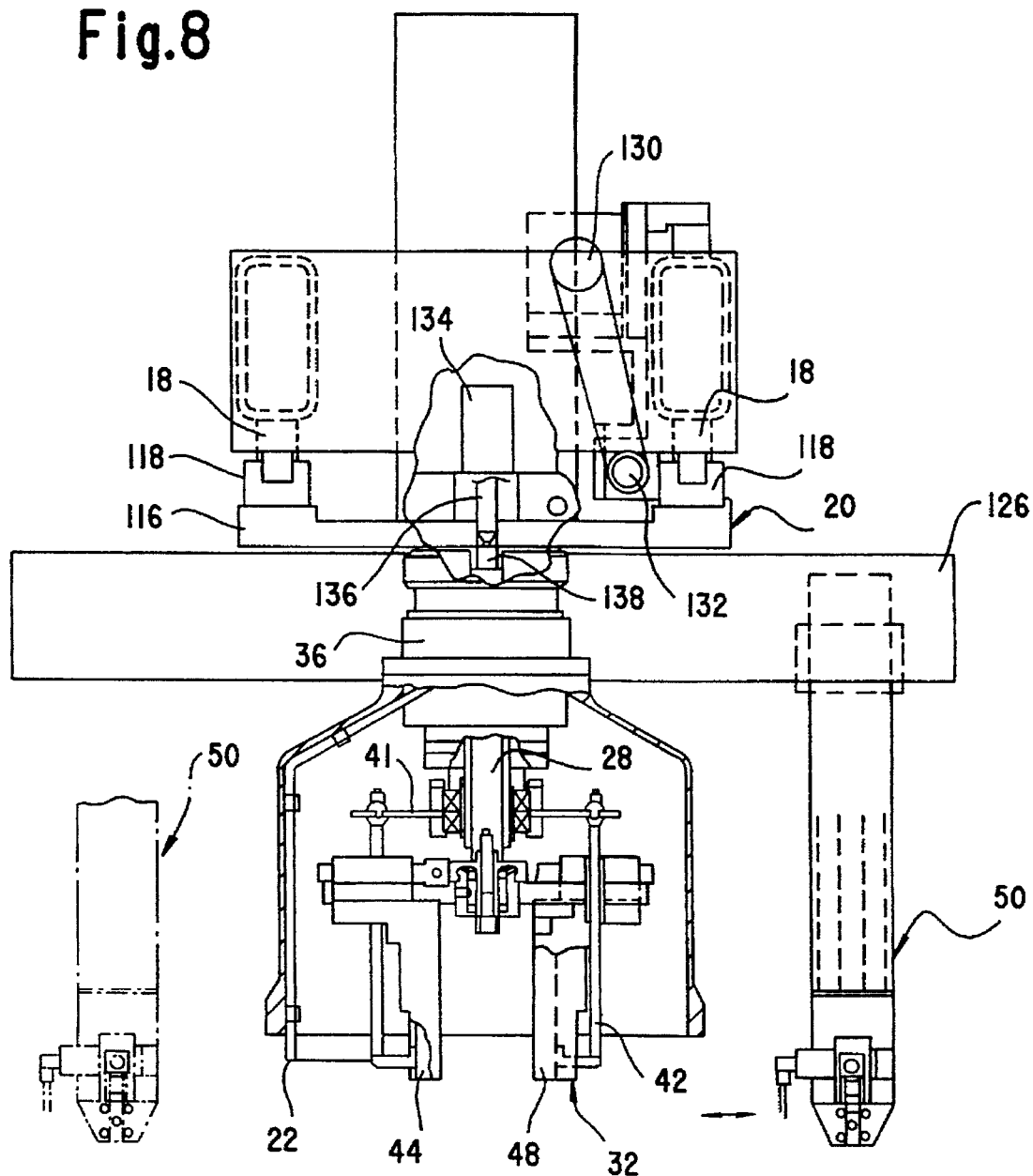
FIG. 8 shows the template and the coupling for switching on its adjusting drive in a larger scale than in FIG. 6.
Figure 9:
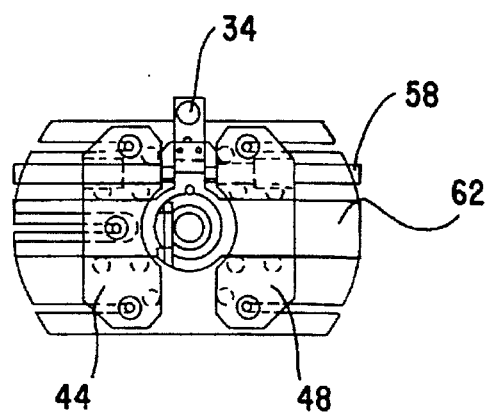
FIG. 9 is a top view of the template of FIG. 8.

The displacement of the spindle box 20 takes place in the device in accordance with FIGS. 6 to 9 by means of the wire drawing device 50. In contrast to the device in accordance with FIGS. 1 to 5, the device 50 can be displaced along the linear guide 18 independently of the spindle box 20. For this purpose it has a cross-piece 126 extending in the direction of the X-axis, which is also guided on the two rails of the linear guide 18 by means of carriages 128. As represented in FIG. 6, the carriages 128 of the wire drawing device 50 are disposed between the carriages 118 of the spindle box 20 and, as can be seen in FIG. 8, the cross-piece 126 of the wire drawing device 50 can be moved below the support plate 116 of the spindle box 20 (for improved clarity of the drawing, the wire drawing device is represented next to instead of under the spindle box in FIG. 7). A drive motor 130 is used as the drive for the wire drawing device 50, which is seated on the linear guide 18, i.e. on the machine frame 10 and displaces, in a manner corresponding to that described in the first exemplary embodiment in connection with the motor 64, the cross-piece 126 in the direction of the Y-axis via a screw spindle 132 and a nut cooperating with it, which is fastened, fixed against relative rotation, on the cross-piece 126 of the wire drawing device 50.

A coupling cylinder 134 is fastened in a vertical position close to the left end in FIG. 7 of the support plate 116 of the spindle box which, when actuated, can advance a coupling bolt 136 downward through a hole in the support plate 116, so that the coupling bolt 136, which is preferably chamfered on its free end, can engage a matching hole 138 in the cross-piece 126 of the wire drawing device 50 or a bushing connected therewith when the cross-piece 126 has been moved by means of the drive motor 130 into the position wherein the hole 138 or the bushing are aligned with the coupling bolt 136. This relative position between the spindle box 20 and the wire drawing device 50 can be set in a simple, known manner, for example by means of a proximity initiator (Bero), not shown in detail, fastened on the support plate 116, and a switching lug, also not shown, fastened on the cross-piece 126 of the wire drawing device 50, which in the course of the displacement movement of the wire drawing device 50 triggers a switching signal of the proximity initiator, which turns the motor off and stops the cross-piece 126 in the position in which the coupling bolt 136 is aligned with the hole 138.

Finally, FIG. 6 shows a photoelectric barrier 140 fastened on the machine frame 10 by means of a holder 142. It is triggered and emits a switching signal when the light beam is broken by the inner edge of the template front part 44. In the position of the template front part 44 thus defined, it has, for example, the required aligned position for lowering the coil receiver 16, or a defined distance from the alignment position.

With the winding device in accordance with FIGS. 6 to 9, the automatic adjustment and control of the template width and of the correct position of the spindle box 20 in relation to the machine frame 10 and thus to the coil receptacle 16 takes place as follows:

After switching the machine on, the control at first is not aware of the template width and the position of the head stock 20. Making reference to FIGS. 6 and 7, the wire drawing device 50 therefore first moves to the left end of the support plate 116, where the proximity initiator mentioned, by means of the switching lug attached to the cross-piece 126, causes the wire drawing device 50 to stop in the position in which the coupling bolt 136 is aligned with the hole 138. Following the stop, coupling by means of the coupling cylinder 134 takes place, and the brake is subsequently released by the automatic sequence control of the machine, so that now the spindle box 20 is taken along via the couplings 136, 138 in both directions along the Y-axis when the wire drawing device 50 is displaced. The drive 130, 132 of the wire drawing device 50 is connected with a measuring sensor which, starting at a defined initial position, generates pulses corresponding to the displacement path, so that the control device of the machine always is aware of the exact position of the spindle box, i.e. the center shaft 23 of the template 32 and of the flyer 22, because of the path measurements in relation to the initial position.

The initial position for the path measurements of the displacement move of the wire drawing device 50 and of the spindle box 20 taken along by it via the coupling 136, 138 is determined by means of a proximity initiator, not shown, fixed in place on the linear guide 18, and a switching lug, which cooperates with it and is attached to the cross-piece 126 of the wire drawing device 50 or the support plate 116. To reach the initial position in the example, the wire drawing device 50 with the spindle box 20 moves to the right in FIGS. 6 and 7. Let it be assumed that the initial position determined by the last mentioned proximity initiator has approximately been attained when the center line 24 is located at the photoelectric barrier 140.

After reaching this initial position and after the measuring sensor is switched on for measuring the distances, as well as after switching on the photoelectric barrier 140, the wire drawing device 50 again moves toward the left in FIG. 6, taking along the spindle box 20, until the inner edge of the template front part 44 breaks the photoelectric barrier 140. Because of the determination at this moment of the distance measured from the initial position, the control device is aware of the template width which existed when the machine was switched on and had remained unchanged up to that time, since in this embodiment, too, both template halves are uniformly displaced with reference to the center axis 24 by the adjusting spindle 58.

In the next step the wire drawing device 50 with the spindle box 20 moves to the right again into the initial position while, to shorten the set-up time, the template width is simultaneously set to the desired defined value by means of the flyer drive 26 via the coupling 56, as described above in connection with FIGS. 3 and 4. The setting is controlled by a measuring sensor registering the rotary movement of the flyer drive 26. In the process it is easily possible that there occasionally is a certain amount of slipping movement at the coupling 56, particularly if the coupling disk 56 is a simple friction disk which is simply coupled by only the axial pressure to the lower end of the hollow shaft 38. As can be seen from what follows, deviations from the desired setting of the template width are taken into consideration by the device in accordance with the invention.

The deviations are already noted when, in the next step, the wire drawing device 50 pulls the spindle box 20 to the left, again referring to FIG. 6, until the inner edge of the template front part 44 again breaks the photoelectric barrier 140. At this time the control device determines by means of the distance travelled whether the set template width has the correct value or whether, possibly because of a slippage at the coupling disk 56, there is a deviation from the set value. In the last mentioned case the control device is aware of the actual value of the deviation.

In the next step, preferably with the movement continued, the drive 130 of the wire drawing device 50 pushes the spindle box 20 into a position in which the front template half 44 is aligned with the coil receiver 16, which is in the operating position, in such a way that the template can be lowered into the coil receiver. A previously measured deviation from the set value of the template width is taken into consideration in the course of this last mentioned displacement. If this deviation remains within a defined tolerance range, it does not need to be corrected, because for all practical purposes it is not important whether within the tolerance range the coils produced on the template are minimally larger or smaller than the set value. However, it could also be possible that even within the tolerance range the deviation could have harmful effect during the insertion of the template front part 44 into the coil receiver 16. This is prevented in the above mentioned process in that the size of the deviation is registered and that in any case care is taken to set the template front part 44 correctly in respect to the coil receiver 16.

If, after setting the desired template width, the deviation measured at the moment of the actuation of the photoelectric barrier 140 by the displacement of the spindle box 20 is outside of the tolerance range, the wire drawing device 50 moves the spindle box 20 one more time to the right in the direction toward the initial position, the template width is corrected by means of the flyer drive 28, and the actual template width is again measured by the breaking of the photoelectric barrier 140 by the inner edge of the template part 44.

It follows from the above description that it is useful to arrange the photoelectric barrier in such a way that it is located between the two template halves 44 and 48 when the template front part 44 takes up the aligned position necessary for engagement with the coil receiver 16. However, it can also be disposed slightly further to the right in FIG. 6, toward the initial position outside of the area mentioned. Because, if the inner edge of the template front part 44, arriving from the right, breaks the photoelectric barrier 140, the control device is aware on the basis of the known position of the photoelectric barrier in relation to the coil receiver 116, how far the spindle box 20 must be moved to the right until the required aligned position between the template front part 44 and the coil receiver 16 has been attained. It is possible in a corresponding manner, when the photoelectric barrier is disposed further to the left, to move the spindle box toward the right into the correct alignment position after the breaking of the photoelectric barrier by the inner edge of the template front part 44.

After the drive 130, 132 of the wire drawing device 50 has pushed the spindle box 20 into the position in which the template front part 44 is aligned functionally correct with the coil receiver 16, the spindle box 20 is fixed in place on the linear guide 18 of the machine frame 10 by means of the brake 120, then the coupling between the spindle box 20 and the wire drawing device 50 is released by retracting the coupling bolt 136 toward the top. In the course of the subsequently performed coil winding processes, the motor 130 only drives the wire drawing device 50 in the Y-direction, while the spindle box 20 is maintained in place by the brake 120. The wire drawing device 50, which is controllable in the direction of all three axes, can then perform its known function unhampered, i.e. selectively hold the winding wire clamped, loosely enclose it, pull a defined wire length out of the flyer by means of a relative movement between the flyer and the gripper 52 after clamping the wire and, if desired, cut the clamped wound wire next to the clamping position by means of an integrated cutting device.

Regarding the multitude of employment options without the necessity for retooling, the arrangement of the gripper 52 shown in FIGS. 6 and 8 is more advantageous than the device in FIGS. 1 to 5. By displacement in the direction of the X-axis along the cross-piece 126 it is possible to bring the gripper 52 selectively into positions on opposite sides of the vertical linear center plane extending in the direction of the Y-axis without a necessity for converting or retooling. In all positions of the wire drawing device 50 the gripper 52 can always maintain the position shown in FIG. 6 where it is aligned parallel with the linear guide 18, not to mention the fact that there is an option of integrating a rotary drive for pivoting the gripper 52 around a vertical axis into the wire drawing device 50.

What is claimed is:

1. A device for winding coils for electrical machines, comprising:

a machine frame;

a spindle box mounted on the machine frame;

a motor by which said spindle box is displaceable along a linear guide on the machine frame;

a multi-part template comprising first and second template parts and a central shaft positioned therebetween said multi-part template being held on said machine frame and fixed against relative rotation, said first template part being axially alignable with a coil receiver and fixable in place at a defined position on the machine frame, a width of said multi-part template being adjustable by an essentially uniform change in distance between each of said first and second template parts and the central shaft;

a wire guide seated in the spindle box and rotatable around the central shaft of the template; and a measuring system mounted on the machine frame or spindle box for measuring distance between a point on one of said first and second template parts and a point on the spindle box and measuring distance between a point on the spindle box and a fixed point on the machine frame, whereby actual width of said multi-part template and position relative to the coil receiver is determinable.

2. A device according to claim 1 wherein said measuring system measures distance from a point fixed in relation to the spindle box to a point on one of said template parts and to a point on the machine frame.

3. A device according to claim 1 wherein the measuring system comprises two sensor heads extendable by means of power cylinders from a respective defined initial position in opposite directions away from a support part, a first of said sensor heads being movable against a template part and a second of said sensor heads being movable against a point on the machine frame.

4. A device according to claim 3 further comprising an extractable cable stretched between the two sensor heads, an extracted length of said cable being measurable by a measurement sensor.

5. A device according to claim 3 wherein the first sensor head comprises a free end of a piston-cylinder unit mounted on a gripper of the wire drawing device said piston-cylinder unit being weaker than a cylinder-piston unit acting in the same direction on the gripper and actuating, in a defined extended position, a switch.

6. A device according to claim 1 wherein the measuring system is seated on a wire drawing device mounted on the spindle box.

7. A device according to claim 1 wherein the distance between a point on the machine frame and a point on the spindle box is determined by measuring displacement of the spindle box between an initial position and a position to be measured.

8. A device according to claim 7 wherein the distance between a point on the spindle box and a point on a template part is determined by measuring distance of displacement of the spindle box between a defined initial position and a position in which one of said template parts assumes a defined position in relation to the machine frame.

9. A device according to claim 8 wherein the defined position of the template part is determined by means of a photoelectric barrier.

10. A device according to claim 8 wherein the defined position of the template part comprises a position in which the multi-part template is to be placed into engagement with the coil receiver.

11. A device according to claim 8 wherein the measuring system includes a distance measuring sensor attached to a drive of the spindle box.

12. A device according to claim 7 wherein the spindle box can be coupled with a wire drawing device and is displaceable by means of a drive.

13. A device according to claim 12 wherein the wire drawing device includes a gripper oriented parallel with the linear guide and performing a closing movement, the gripper being controllably movable in a vertical direction as well as linearly and transversely in relation to the linear guide.

14. A device according to claim 1 wherein the width of the multi-part template is adjustable by means of a controllable rotary drive of the wire guide.

15. A device according to claim 14 wherein the two template parts are seated, fixed against relative rotation, by means of a threaded engagement on threaded sections of an adjusting spindle having equal pitch, but opposite pitch direction, said adjusting spindle being driven by a worm drive having a worm rotatably seated, together with the wire guide, on the rotatable central shaft of the template, said worm drive being correctable, fixed against relative rotation, with the shaft by means of a controllable coupling.

16. A device according to claim 15 wherein the coupling is directly or indirectly axially loaded and engaged by a shaft supporting coil strippers and wherein the shaft is advanced when the template has been pulled back toward the spindle box.

17. A device according to claim 1 wherein the distance between a point on the spindle box and a point on a template part is measurable by means of a measuring system which measures the distance of displacement of the spindle box between a defined initial position and a position in which the template part assumes a defined position in relation to the machine frame.

18. A device according to claim 1 wherein the spindle box can be coupled with a wire drawing device and is displaceable by means of a drive for the spindle box.

19. A device according to claim 1 wherein the wire drawing device includes a gripper, oriented in a direction parallel with the linear guide and performing a closing movement in said parallel direction, said gripper being controllably movable in vertical, linear and transverse directions in relation to the linear guide.

* * * * *